(12) United States Patent
Tsubaki et al.

(10) Patent No.: US 7,053,306 B2
(45) Date of Patent: May 30, 2006

(54) ELECTRICITY-FEEDING DEVICE

(75) Inventors: Akira Tsubaki, Shizuoka (JP); Tatsuro Matsuo, Shizuoka (JP); Takahiro Iwasaki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/196,437

(22) Filed: Aug. 4, 2005

(65) Prior Publication Data
US 2006/0027391 A1    Feb. 9, 2006

(30) Foreign Application Priority Data
Aug. 6, 2004 (JP) .............................. 2004-230585

(51) Int. Cl.
*H02G 1/00* (2006.01)

(52) U.S. Cl. ................................... 174/72 A; 174/72 C
(58) Field of Classification Search .............. 174/72 A, 174/135, 72 C
See application file for complete search history.

(56) References Cited

U.S. PATENT DOCUMENTS
6,575,760 B1 * 6/2003 Doshita et al. ............... 439/34

FOREIGN PATENT DOCUMENTS
JP           11-342807           12/1999

* cited by examiner

*Primary Examiner*—Jinhee Lee
(74) *Attorney, Agent, or Firm*—Armstrong, Kratz, Quintos, Hanson & Brooks, LLP

(57) ABSTRACT

An electricity-feeding device includes: a case for accommodating a wire harness bent into a substantially U-shaped form; a slider slidable in the case, in which slider the wire harness is bent and through which the wire harness is led out swingably; and a horizontally long opening disposed between one and the other walls opposite to each other in the case. The slider slides along the opening. The wire harness is bent in traverse from the one wall to the other wall, then bent toward the one wall to be led into the slider, and then led out through the slider and the opening. A rail on which the slider is slidably guided is formed in the vicinity of the opening of the case. A swinging member is formed on the slider. The wire harness is bent and led out through the slider and the swinging member.

3 Claims, 4 Drawing Sheets ably supported on a lower half of the slider 54. A wire harness 55 is bent to be accommodated into a substantially U or J-shaped form in the case 52. The wire harness 55 is fixed to the slider 54 at one end of the wire harness 55, and bent into a substantially U or crank shaped form to be led out from the swinging member 58. The wire harness 55 is also fixed to an upper wall 56 of the case 52 at the other end of the wire harness 55.

ELECTRICITY-FEEDING DEVICE

BACKGROUND OF THE INVENTION

The priority application claims priority of Japanese Patent Application No. 2004-230585, which is hereby incorporated by reference.

FIELD OF THE INVENTION

This invention relates to an electricity-feeding device, and in particular, the electricity-feeding device to reduce a torsional load to a wire harness that is bent into a substantially U-shaped form in a case and led out through a slider.

DESCRIPTION OF THE RELATED ART

FIG. 5 shows an embodiment of a conventional electricity feeding device disclosed in a document JP-A, H11-342807 (Page 4, FIGS. 1 and 2).

In this document, an electricity-feeding device 41 is mounted on a sliding door 42 of a vehicle. A long sideways case 44 accommodates a flat wire harness 45 being bent into a substantially U-shaped form. A slider 46 is slidably mounted on the case 44. One end of the wire harness 45 is fixed on the slider 46, and the other end of the wire harness 45 is fixed on the case 44.

The slider 46 is connected to a vehicle body with a flexible arm 47. A wire harness 48 at a vehicle body side is wired from the one end of the wire harness 45 along the arm 47, and continued to such as a power source. The other end of the wire harness 45 is connected to a wire harness at a door side (not shown) being continued to auxiliary components such as a power window motor in the sliding door 42, a door locking unit, a switching unit, and a speaker.

A reinforcing plate is attached to the flat wire harness 45 for preventing slack. A bottom wall is formed on a case 44. The wire harness 45 is bent into a substantially U-shaped form along from an upper wall 49 of the case 44 to the bottom wall parallel to the upper wall 49.

When closing the sliding door 42 from a half-open position in a forward direction of an arrow A of FIG. 5, the slider 46 is relatively shifted backward to a rear side of the case 44, and the wire harness 45 is bent into a substantially U-shaped form in a manner that an upper part of the wire harness 45 is the same length as a lower part of the wire harness 45. When opening the sliding door 42 in a backward direction of an arrow B of FIG. 5, the slider 46 is relatively shifted forward to a front side of the case 44, and the wire harness 45 is bent into a substantially J-shaped form in a manner that the upper part becomes longer than the lower part of the wire harness 45. Therefore, the slack of the wire harness 45 is absorbed, and auxiliary components are respectively fed with electricity constantly.

However, since the conventional electricity-feeding device 41 uses a flat wire harness as the wire harness 45, there is problems that such an electricity-feeding device requires the resilient reinforcing plate for regulating the slack of the wire harness 45, and requires installation cost and components cost of the reinforcing plate.

Accordingly, the inventors of the present invention have invented an electricity-feeding device as shown in FIG. 6 using a normal wire harness having a substantially circular or oblong section instead of the flat wire harness.

The electricity-feeding device 51 includes a case 52 made of synthetic resin, a slider 54 slidable along a bottom wall 53 of the case 52, and a swinging member swingably supported The case 52 has a substantially horizontally long rectangular shaped form, and includes upper and lower parallel walls 56, 53. The swinging member 58 is protruded downward from the bottom wall 53 of the case 52. The wire harness 55 is bent into a substantially U or crank shaped form to be wired from the slider 54 to the swinging member 58, and led out from the swinging member 58 to a mobile member such as a sliding door.

In a case that the electricity-feeding device 51 is used in a sliding door of a vehicle, as shown as a chain line in FIG. 6, when opening the sliding door, the slider 54 is relatively shifted forward of the case 52, and a bottom half 55b of the wire harness 55 slides forward along the bottom wall 53 of the case 52. As shown in a solid line in FIG. 6, when closing the sliding door, the slider 54 is relatively shifted backward of the case 52, and the bottom half 55b of the wire harness 55 slides backward along the bottom wall 53 of the case 52.

Other than the sliding door of a vehicle, the electricity-feeding device 51 is applicable to a sliding seat, rotary back door, a trunk of a vehicle, a sliding door of other machines other than the vehicle, and the like. Each of the sliding seat, the rotary back door, the trunk of a vehicle and the like is referred to as a mobile member, while a vehicle body or the like at the power source side is referred to as a fixed member.

However, in the electricity-feeding device 51, since the swinging member 58 supported on the lower half of the slider 54 is protruded downward, there are problems below. Firstly, a length from an upper end of the case 52 to the swinging member 58 is increased. Secondly, a height of the electricity-feeding device 51 is increased. Thirdly, a possibility that when being slid, the lower half of the slider 54 or the swinging member 58 is interferes with outer members is increased. Fourthly, an appearance of the electricity-feeding device 51 is decreased.

Further, since the wire harness 55 is bent at right angle twice at positions next to each other in a substantially U or crank shaped form (a interval of the bent part is shown as "L" in FIG. 6), a large torsional load is applied to the wire harness 55 between both bent parts as the slider 54 slides. Resultingly, there is a problem that repetitive twists reduce durability of the wire harness 55.

Accordingly, an object of the present invention is to provide an electricity-feeding device for preventing the electricity-feeding device from being upsized and from interfering with outer members caused by a protrusion of a slider or a swinging member, and for decreasing a torsional load applied to a wire harness in the slider or the swinging member to improve durability of the wire harness.

SUMMARY OF THE INVENTION

In order to attain the object, according to the present invention, there is provided an electricity-feeding device including:

a case for accommodating a wire harness bent into a substantially U-shaped form;

a slider being slidable in the case, in which slider the wire harness is bent and through which the wire harness is led out swingably; and a horizontally long opening disposed between one and the other walls in the case, along which opening the slider slides, whereby the wire harness is bent in traverse from the one wall to the other wall, bent toward the one wall to be led into the slider, and led out through the slider and the opening.

According to the above, when the slider slides toward a bent part of the wire harness along the one wall, the wire harness is bent into a substantially loop shaped form having a large radius in between the one and the other walls. Further, when the slider slides in a direction opposite to the bent part of the wire harness along the one wall, the wire harness is bent into a substantially horizontally long half loop shaped form having a large radius in between the one and the other walls. In both cases, the wire harness led into the slider in the case is bent smoothly with a large radius, and arranged with a large radius from the other wall to the slider. The wire harness includes a first bent part with a large radius at the other wall side, and a second bent part with a small radius at the slider side. However, since an interval between both of the bent parts is large, a twist between both of the bent parts of the wire harness caused by the movement of the slider is reduced, and the durability of the wire harness against the repetitive twists is improved. The wire harness is bent with a small radius only in the slider in the case. Further, a whole body of the slider is accommodated in the case. Therefore, the slider is prevented from interfering with outer members, and the appearance of the electricity-feeding device is improved. Since the whole body of the slider is accommodated in the case, the electricity-feeding device is miniaturized.

Preferably, the electricity-feeding device further includes a rail formed in the vicinity of said opening of the case, on which rail the slider is slidably guided.

According to the above, the slider is slidably engaged with the rail. The slider is supported securely by the rail in the middle thereof, and allowed to slide smoothly. In the case, the wire harness is arranged in between the one and the other walls, and the slider is allowed to smoothly slide back and forth along the rail without interfering with the wire harness.

Preferably, the electricity-feeding device further includes a swinging member formed on the slider. The wire harness is bent and led out through the slider and the swinging member.

According to the above, the wire harness is led into the slider, bent through the slider and the swinging member, and then led out. The wire harness is bent with a small radius only at this part of the electricity-feeding device. Thus, the bent part length with the small radius according to the present invention is reduced to half of that of the conventional electricity-feeding device. As the slider slides, the swinging member swings to absorb a slack of the wire harness.

Preferably, the one wall is nearer to the slider than the other wall for allowing the wire harness to be bent into a substantially U-shaped form with a larger radius.

The above and other objects, features, and advantages of the present invention will be better understood when taken in connection with the accompanying drawings and description.

DESCRIPTION OF THE PREFERRED EMBODIMENTS

Embodiment of the Present Invention

Figure 1:
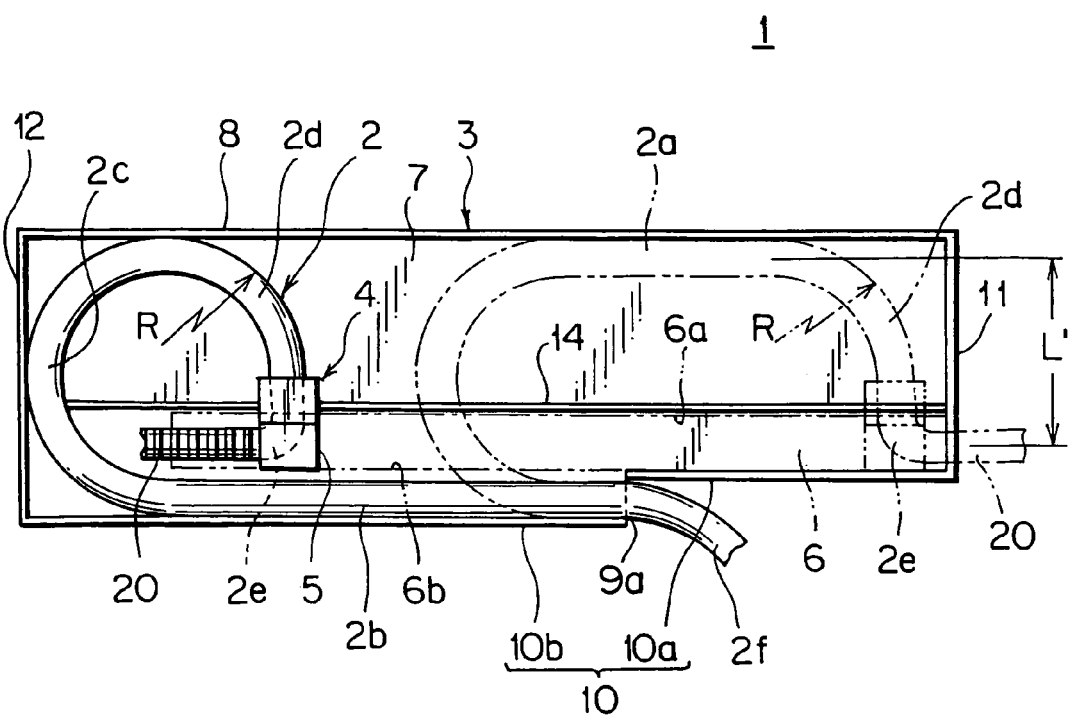
FIG. 1 is a front schematic view showing an embodiment of an electricity-feeding device according to the present invention.
Figure 3:
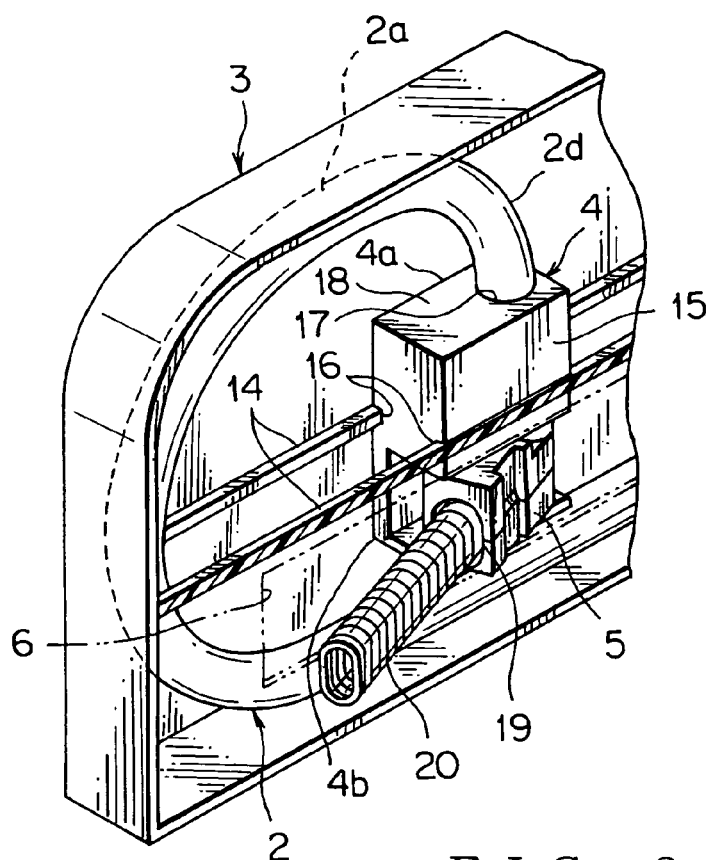
FIG. 3 is a partially enlarged perspective view showing a main part of FIG. 2.
Figure 2:
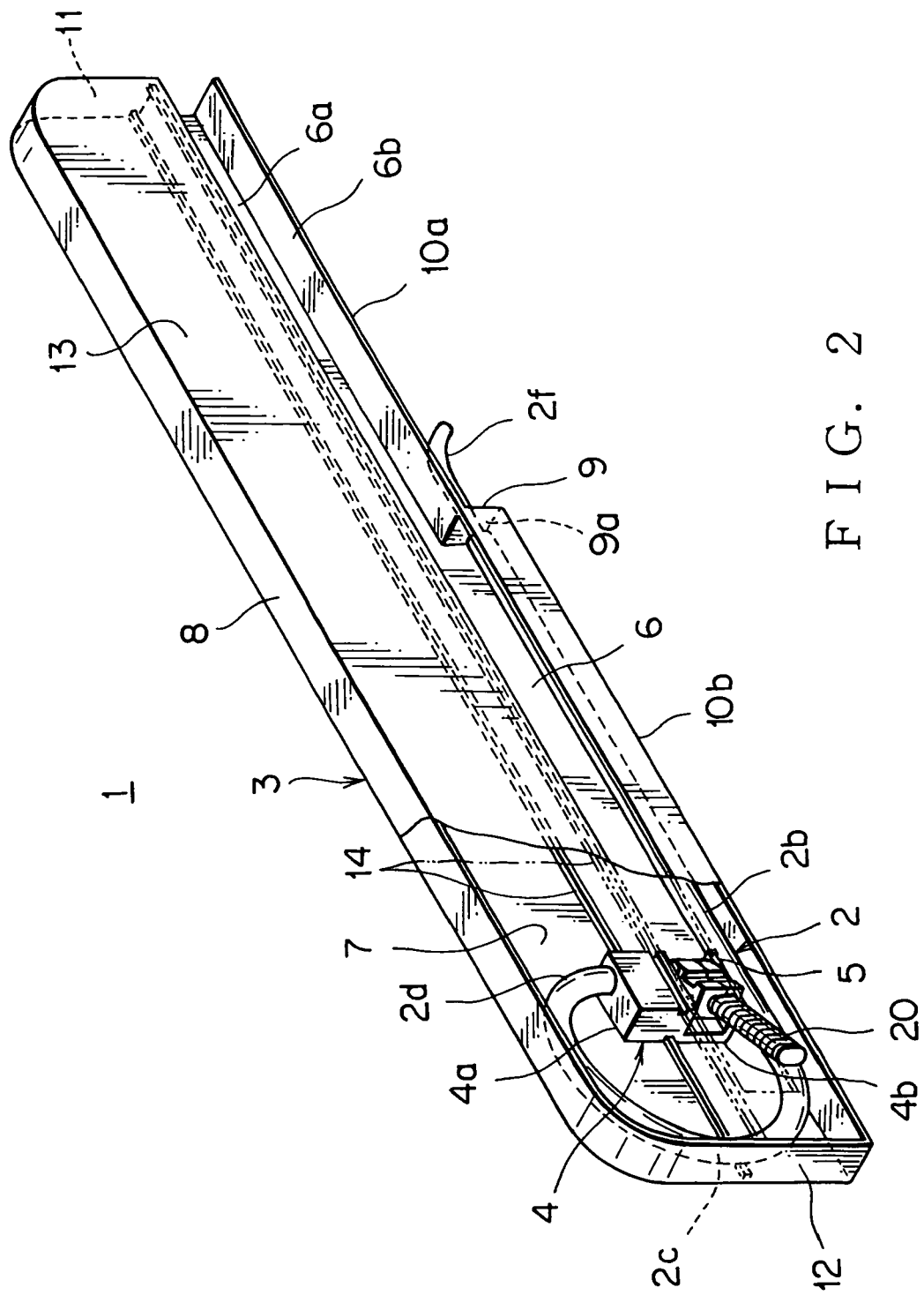
FIG. 2 is a perspective view showing a slider sliding to one end of a case according to the embodiment of the electricity-feeding device of the present invention.
Figure 4:
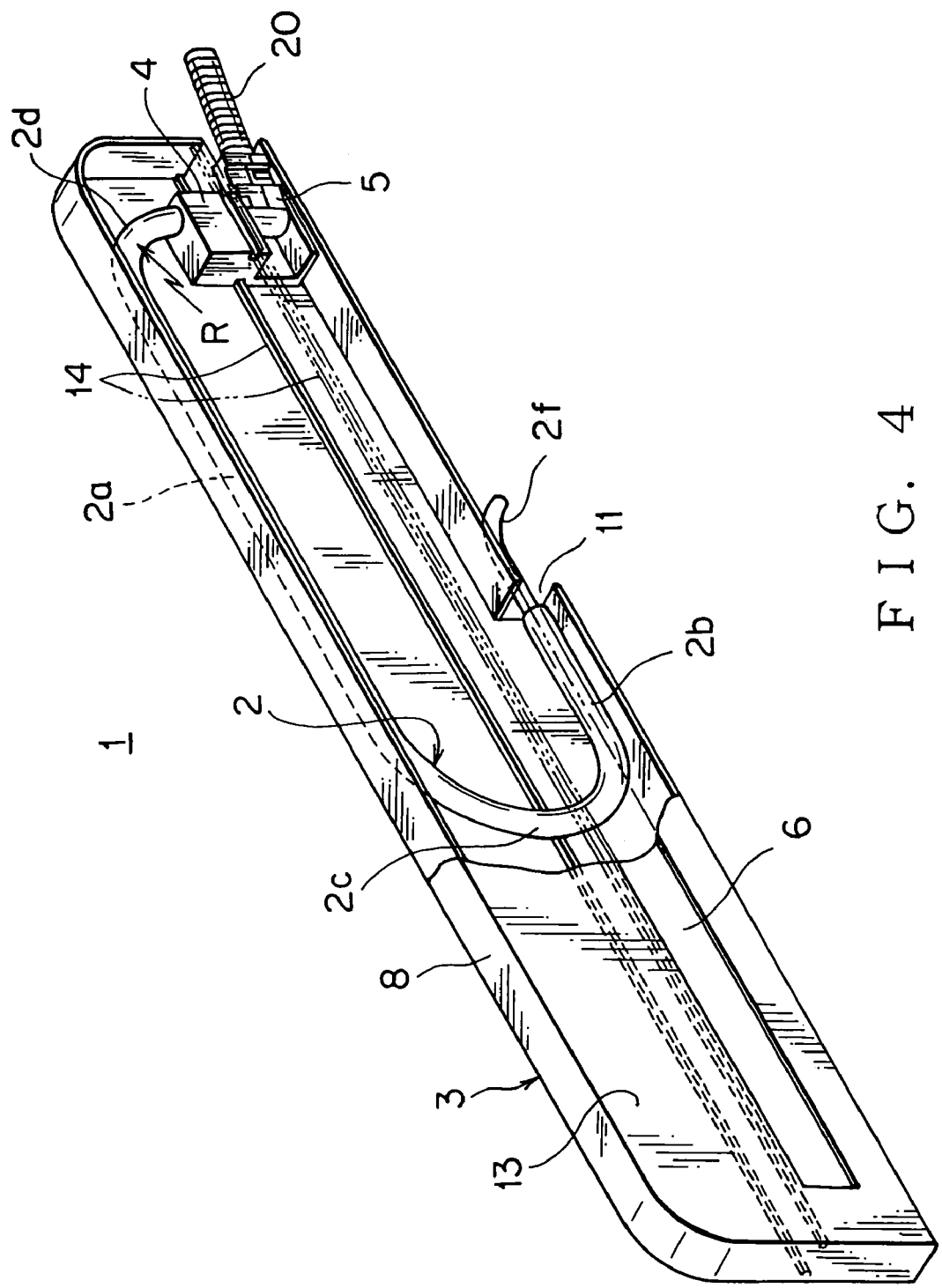
FIG. 4 is a perspective view showing the slider sliding to the other end of the case according to the embodiment of the electricity-feeding device of the present invention.
Figure 5:
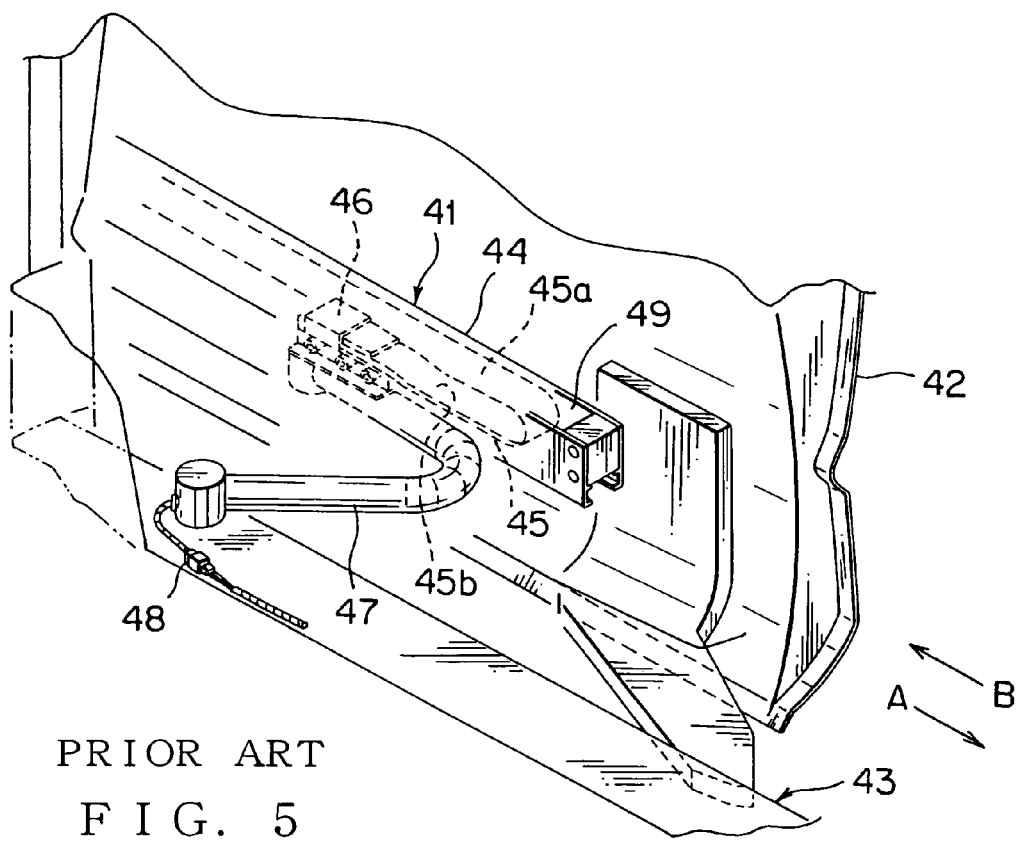
FIG. 5 is a perspective view showing one embodiment of a conventional electricity-feeding device.

FIGS. 1 to 4 show an embodiment of an electricity-feeding device 1 according to the present invention. FIG. 1 shows a schematic view of the electricity-feeding device 1, and FIGS. 2 to 4 show configurations of the electricity-feeding device 1 of which slider is sliding.

The electricity-feeding device 1 includes a case 3 and a slider 4. The case 3 is made of synthetic resin in a substantially rectangular shaped form, and receives a wire harness bent into a substantially U-shaped form or a loop shaped form. The slider 4 is made of synthetic resin, engaged slidably with the case in between an upper part 2*a* and a lower part 2*b* of the wire harness 2, and bend the wire harness 2 into a substantially L-shaped form to lead out the wire harness 2 from the case 3 through a horizontally long opening 6 with a swinging member 5.

The case 3 includes: a base wall 7; an upper wall 8 (the other wall) being straight, horizontally long, and orthogonal to an upper end of the base wall 7; a bottom wall 10 (the one wall) being parallel to the upper wall 8 and including first and second half walls 10*a*, 10*b*, and a step 9 in the middle of the bottom wall 10 in a longitudinal direction; a narrow opening 9*a* provided on the step 9; front and rear walls 11, 12 being orthogonal to the base wall 7 on both ends of the base wall 7; and a cover wall 13 being parallel to the base wall 7. In FIG. 1, the cover wall 13 is omitted.

The first half wall 10*a* of the bottom wall 10 in the case 3 is higher than the second half wall 10*b*. The wire harness 2 is led into the opening 9*a* on the step 9, and guided along the second half wall 10*b* inside the case 3. A lower part 2*b* of the wire harness 2 is fixed on the case 3 in the vicinity of the opening 9*a* by a fixing member such as a band (not shown).

As shown in FIG. 2, a horizontally long opening 6 for leading out the wire harness 2 is formed on the cover wall 13 along the first half wall 10*a* in the case 3. A front end of the opening 6 penetrates the front wall 11 of the case 3, and a rear end of the opening 6 reaches short of the rear wall 12. Both upper and lower ends 6*a*, 6*b* of the opening 6 are parallel to the bottom wall 10 and the upper wall 8. The lower part 2*b* of the wire harness 2 is disposed between the second half wall 10*b* and the opening 6.

A pair of rails 14 opposite to each other is provided horizontally on inner walls of the base wall 7 and the cover wall 13 along the upper end 6*a* of the opening 6. A vertically middle part of the slider 4 is engaged slidably with the rails 14. As shown in FIG. 2, an upper half 4a of the slider 4 in a block shaped form is positioned higher than the opening 6. A lower half 4b of the slider 4 having a substantially L-shaped section is positioned in the opening 6. The pair of the rails 14 is arranged in the vicinity of the opening 6.

A swinging member 5 in a block shaped form is pivotably supported by the lower half 4b of the slider 4 in a manner that the swinging member 5 is allowed to swing horizontally, and a distal end of the swinging member 5 is allowed to protrude through the opening 6 when swinging. Using a short swinging member 5 prevents the distal end of the swinging member 5 from protruding through the opening 6. A harness accommodation space is formed in between the bottom wall 10 and the upper wall 8 in the case 3, so that an enough space exists in between the upper half 4a of the slider 4 and the upper wall 8.

The wire harness 2 led through the opening 9a is bent upward in a substantially U-shaped form in the vicinity of the rear wall 12 in the case 3. Then, the wire harness 2 is arranged forward along the upper wall 8, and bent downward with a large radius to be led into the slider 4. Then, the wire harness 2 is vertically passed through the slider 4, and bent at right angle in an interior of the lower swinging member 5. Finally, the wire harness 2 is led out through the opening 6. A radius of curvature of a bent part 2d of the wire harness 2 over the slider 4 is substantially the same as that of a bent part 2c in the substantially U-shaped form. Therefore, only a bent part 2e (shown in FIG. 1) is bent with a small radius in traverse from the slider 4 to the swinging member 5.

As shown in FIG. 3, rails 14 are formed into a rectangular section (or a triangle section) in a substantially vertical middle of the case 3. Slidably engaging grooves 16 are formed into a rectangular section (or a triangle section) on both sidewalls 15 of the slider 4 in a substantially vertical middle of the slider 4.

Preferably, the upper half 4a of the slider 4 is dividable back and forth, or right and left, so that grooves for inserting the wire harness 2 are formed into a semicircular section on both of the divided blocks vertically throughout the divided blocks. A vertical harness insertion hole 17 is formed into a circular section by coupling the grooves of the divided blocks. Preferably, the divided blocks are locked to be fixed on each other with locking members such as a locking nail and a locking recess (not shown).

As shown in FIG. 3, the wire harness 2 is bent with a large radius at the upper part 2a of the wire harness 2, and bent at the bent part 2d to be led into the insertion hole 17 on an upper wall 18 of the slider 4. Then, the wire harness 2 is bent at right angle in traverse from the slider 4 to the swinging member 5, and led out from the swinging member 5.

The swinging member 5 is disposed in the lower half 4b of the slider 4 having a frame shape. The swinging member 5 is supported movably on upper and lower vertical shafts (or recesses) thereof, by upper and lower recesses (or shafts) of the upper and lower inner walls of the slider 4. The swinging member 5 is dividable to upper and lower blocks. Harness insertion grooves are formed on inner walls of the divided blocks in a curved shaped form at right angle. A harness insertion hole 19 is formed by coupling the harness insertion grooves.

The swinging member 5 of this embodiment includes: the harness insertion hole 19 having an oblong section for supporting a corrugate tube 20, said corrugate tube 20 being made of synthetic resin, and having an oblong section for protecting an outer peripheral wall of the wire harness 2; and a rib (not shown) for engaging with a circular groove of the corrugate tube 20 in an inner circumferential wall in the vicinity of a distal end of the harness insertion hole 19.

The upper half 4a of the slider 4 includes the insertion hole 17 having a circular section for supporting a wire-harness-protecting tube 2 such as a flexible mesh tube or a corrugate tube having a circular section. An end of the protecting tube 2 is fixed to an interior of the harness insertion hole 17.

As shown in a solid line in FIGS. 1 and 2, when the slider 4 slides toward the back end of the case 3 along the opening 6, the wire harness 2 in the case 3 is smoothly bent into a substantially circular loop in traverse from the lower part 2b of the wire harness 2 to the slider 4 along the rear wall 12. In other words, bent parts 2c, 2d of the wire harness 2 led from the slider 4 into the case 3 is smoothly bent into a substantially circular loop and continued to the lower part 2b on the second half wall 10b in the case 3. The wire harness 2 is bent at right angle only in the swinging member 5 to swing backward.

Thus, as shown in FIG. 1, the wire harness 2 is bent only at one bent part 2e with a small radius in the swinging member 5. On the other hand, as shown as a solid line in FIG. 6, conventionally the wire harness 2 is bent twice at the slider and the swinging member. Further, the wire harness 2 is bent in a folding direction. Therefore, bending stress applied to the wire harness 2 of the present invention is reduced to less than half of that in the conventional electricity-feeding device.

As shown in a chain line in FIG. 1 and shown in FIG. 4, when the slider 4 slides toward the front end of the case 3 along the opening 6, the wire harness 2 in the case 3 is smoothly bent into a substantially U or J-shaped form in the substantially horizontal middle of the case, the upper part 2a of the wire harness 2 extends straight along the upper wall 8 of the case 3, the bent part 2d is smoothly bent downward with a large radius in traverse from the upper part 2a of the wire harness 2 to the slider 4. In other wards, the wire harness 2 led upward from the slider 4 into the case 3 is smoothly bent backward at the bent part 2d of the wire harness 2 with a large radius and continued to the upper part 2a along the upper wall 8 in the case 3. The wire harness 2 is bent at right angle only in the swinging member 5 to swing forward.

Thus, the wire harness 2 is bent only at one bent part 2e with a small radius in the swinging member 5. On the other hand, as shown as a chain line in FIG. 6, conventionally the wire harness 2 is bent twice at the slider and the swinging member. Further, as shown as a solid line in FIG. 6, the wire harness 2 is bent in a substantially crank shape. Therefore, bending stress applied to the wire harness 2 of the present invention is reduced to less than half of that in the conventional electricity-feeding device.

Figure 6:
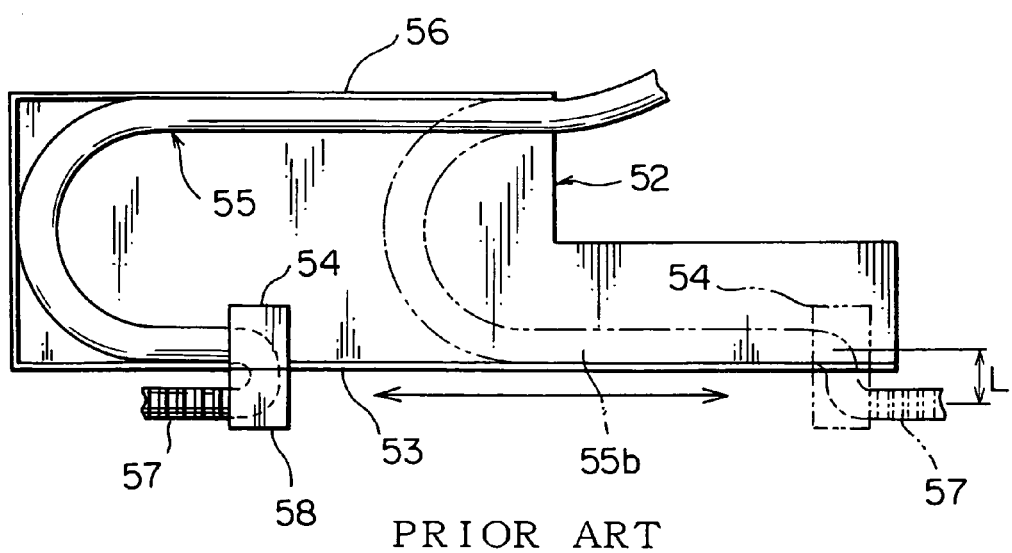
FIG. 6 is a front schematic view showing another embodiment of the conventional electricity-feeding device.

As shown in FIG. 1, a bending section of the wire harness 2 in the case 3 as a height L' of the case 3 is much increased as compared with a conventional bending section L in FIG. 6. Therefore, a torsional load applied to the wire harness 2 is much reduced. Namely, since the section L' between the bent part 2d of the wire harness 2 with a large radius in the vicinity of the upper wall 8 and the bent part 2e with a small radius in the swinging member 5 in the vicinity of the bottom wall 10 is much larger than the conventional section L, an angle between the bent parts 2d and 2e is much smaller than that in the conventional electricity-feeding device when the slider 4 slides.

When the electricity-feeding device 1 is mounted on a left sliding door of a vehicle, the configuration shown as a solid line in FIG. 1 and shown in FIG. 2 corresponds to a condition that the sliding door is fully closed. In the case 3, the slider 4 is positioned at the back side of the case, the wire harness 2 is compacted in a loop shape, and the swinging member 5 swings obliquely backward.

A part 2f of the wire harness 2 led out through the opening 9a at the lower side of the case 3 (fixing side) is arranged in the sliding door to be connected to auxiliary components such as a power window motor, a door lock unit, a door mirror driving motor, a speaker, a courtesy lamp, and a switch unit. A part 20 of the wire harness 2 led out through the slider 4 and the swinging member 5 is connected to a wire harness at the vehicle side via a transition space between the sliding door and a vehicle body.

Sliding the sliding door from the fully closed position makes the sliding door in a fully open position as shown in the chain line in FIG. 1 and in FIG. 4. The slider 4 is positioned at a front side of the case 3. The wire harness 2 is extended in a substantially horizontally long semi-loop shaped form in the case 3. The swinging member 5 swings obliquely forward.

The electricity-feeding device 1 is not limited to the sliding door of a vehicle, but also applied to a sliding sheet of a vehicle. In this case, the part 2f of the wire harness 2 led out through the opening 9a at the lower side of the case 3 is connected to a floor wire harness at a battery side, and the part 20 of the wire harness 2 led out through the swinging member 5 is connected to auxiliary components such as an occupant sensor for sensing a seated vehicle driver, a heater and the like.

When applied to a sliding seat, preferably, the case 3 is not arranged vertically, but horizontally. Further, the electricity-feeding device 1 may not be arranged in a sliding door, but in a vehicle body. In this case, the part 2f of the wire harness 2 led out through the opening 9a at the fixing side of the case 3 is connected to the wire harness of the vehicle body (battery side), and the part 20 of the wire harness 2 led out through the swinging member 5 is arranged in the sliding door via the transition space.

Further, when applied to the sliding door or the sliding seat, the electricity-feeding device 1 may be arranged upside down. In this case, the solid line in FIG. 1 and FIG. 2 show the fully opened sliding door of the electricity-feeding device 1. The chain line in FIG. 1 and FIG. 4 show the fully closed sliding door of the electricity-feeding device 1. The upper wall of the case 3 turns to the bottom wall, and vice versa. The rear wall turns to the front wall, and vice versa.

The electricity-feeding device 1 is applicable to rotary mobile members such as a trunk or a back door of a vehicle, and elevating mobile members. In these cases, a longitudinal side of the electricity-feeding device 1 is arranged vertically, the part 2f of the wire harness 2 is connected to the battery, and the part 20 of the wire harness 2 is arranged into the mobile member.

In the above embodiment, the swinging member 5 is used. However, when the swing angle of the part 20 of the wire harness 2 is small, the swinging member 5 may be omitted, and the part 20 may be directly led out from the lower half 4b of the slider 4. In this case, the lower half 4b of the slider 4 has a block shape, and preferably has a harness insertion hole 19 for bending the wire harness 2 at right angle.

Further, instead of engaging slidably the grooves 16 of the slider 4 with the rails 14 of the case 3, a pulley or the like for engaging with the rails 14 may be provided rotatably on the slider 4. Further, only a rail 14, instead of the pair of the rails 14, may be provided in the case 3. In this case, a rotatable ball or the like may slide the slider 4 with low friction on the inner wall opposite to the wall on which the rail 14 is formed, or a sliding wall of the slider 4 may be made of low friction material. Further, instead of the rails 14, slits may be formed on the case 3, and shafts projecting from the front and rear sides of the slider 4 may be engaged in the slits slidably.

Further, miniaturizing the electricity-feeding device 1 is the reason why the first half wall 10a of the case 3 is formed higher than the second half wall 10b via the step 9. Therefore, if the miniaturization is unnecessary, the first half wall 10a may be the same height as the second half wall 10b, and the opening 9a may be provided horizontally in the middle of the bottom wall 10 for leading out the part 2f of the wire harness 2.

As shown in FIGS. 1 and 3, since the bottom wall (one wall) 10 is nearer to the slider 4 than the upper wall (the other wall) 8, the wire harness 2 is bent into a substantially U-shaped form having a larger radius.

Having now fully described the present invention, it will be apparent to one of ordinary skill in the art that many changes and modifications can be made thereto without departing from the scope of the invention as set forth herein.

What is claimed is:

1. An electricity-feeding device comprising:
   a case for accommodating a wire harness bent into a substantially U-shaped form;
   a slider being slidable in the case, wherein the wire harness is bent in the slider, and wherein the wire harness is led out swingably through the slider, and
   a horizontally long opening disposed between one wall and other walls in the case, wherein the slider slides along the opening, wherein the wire harness is bent in traverse from the one wall to the other walls, wherein the wire harness is bent toward the one wall to be led into the slider, and led out through the slider and the opening,
   wherein a swinging member is formed on the slider,
   wherein the wire harness is bent and led out through the slider and the swinging member,
   wherein the swinging member surrounds the perimeter of the wire harness and moves with the wire harness.

2. The electricity-feeding device as claimed in claim 1 further comprising a rail formed in the vicinity of said opening of the case, wherein the slider is slidably guided on the rail.

3. The electricity-feeding device as claimed in claim 1, wherein the one wall is nearer to the slider than the other walls for allowing the wire harness to be bent into a substantially U-shaped form with a larger radius.

* * * * *